United States Patent [19]

Campbell

[11] 4,375,840
[45] Mar. 8, 1983

[54] MOBILE SUPPORT

[76] Inventor: Jack L. Campbell, P.O. Box 659, Newcastle, Wyo. 82701

[21] Appl. No.: 305,027

[22] Filed: Sep. 23, 1981

[51] Int. Cl.³ ................ B62D 11/004; B62D 61/012
[52] U.S. Cl. .............................. 180/6.5; 180/DIG. 3; 248/129; 269/17; 280/29; 280/220; 297/DIG. 4; 182/2
[58] Field of Search .................. 180/6.5, 6.48, 6.2, 180/6.24, 6.26, 6.28, 6.3, 6.32, 6.34, 6.36, 6.38, 6.4, 6.5, 6.54, 6.58, 6.6, 6.62, 6.64, 6.66, 7 R, 8 A, 65 F, 65 R, 209, 216, 242, 315, DIG. 3, 9.24 R; 280/5.3, 47.38, 211, 29, 242 WC, 289 WC, 417, DIG. 10, 650; 297/66, 71, 330, 347, 352, 466, DIG. 4, DIG. 10; 301/5 P; 296/65 R; 5/81 R, 86

[56] References Cited

U.S. PATENT DOCUMENTS

| 3,236,556 | 2/1966 | Lathers | 296/65 R |
|---|---|---|---|
| 3,882,949 | 5/1975 | Anderson | 180/8 A |
| 3,901,337 | 8/1975 | Cragg | 180/6.5 |
| 3,905,436 | 9/1975 | Karchak, Jr. et al. | 180/6.5 |
| 3,937,519 | 2/1976 | Schoolden | 297/DIG. 10 X |
| 3,952,822 | 4/1976 | Udden et al. | 180/216 |
| 4,010,499 | 3/1977 | Davis et al. | 5/81 R |

FOREIGN PATENT DOCUMENTS

| 2205941 | 8/1973 | Fed. Rep. of Germany | 280/242 WC |
|---|---|---|---|
| 1432999 | 4/1976 | United Kingdom | 296/65 R |
| 1455241 | 11/1976 | United Kingdom | 280/242 WC |

*Primary Examiner*—Joseph F. Peters, Jr.
*Assistant Examiner*—M. J. Hill
*Attorney, Agent, or Firm*—Harvey B. Jacobson

[57] ABSTRACT

A base frame is provided defining two pairs of opposite marginal portions with the pairs of marginal portions spaced horizontally apart in vertical planes intersecting each other and the marginal portions of each pair spaced on opposite sides of the point of intersection of the planes. A first pair of omnidirectional support structures are mounted from a first pair of the marginal portions and a second pair of reversely and variably drivable support structures are steerably mounted from the second pair of marginal portions for angular displacement about upstanding axes relative to the second pair of marginal portions. Further, steering control structure is operably connected between the frame and the second pair of support structures operable to selectively, variably and equally angularly displace the second pair of support structures relative to the second marginal portions. A pair of extendible uprights are mounted at their lower ends from the frame for equal angular displacement about a first horizontal axis extending therebetween and equal angular displacement about horizontal axes generally normal to the first axis. A brace is pivotally connected between the upper extendible ends of the uprights and includes a sleeve thereon oscillatable about its longitudinal axis and a support arm projects outwardly from the sleeve and is longitudinally extendible. The outer extendible end of the arm supports an operator mount therefrom for adjustable angular displacement about a horizontal axis transverse to the support arm.

13 Claims, 7 Drawing Figures

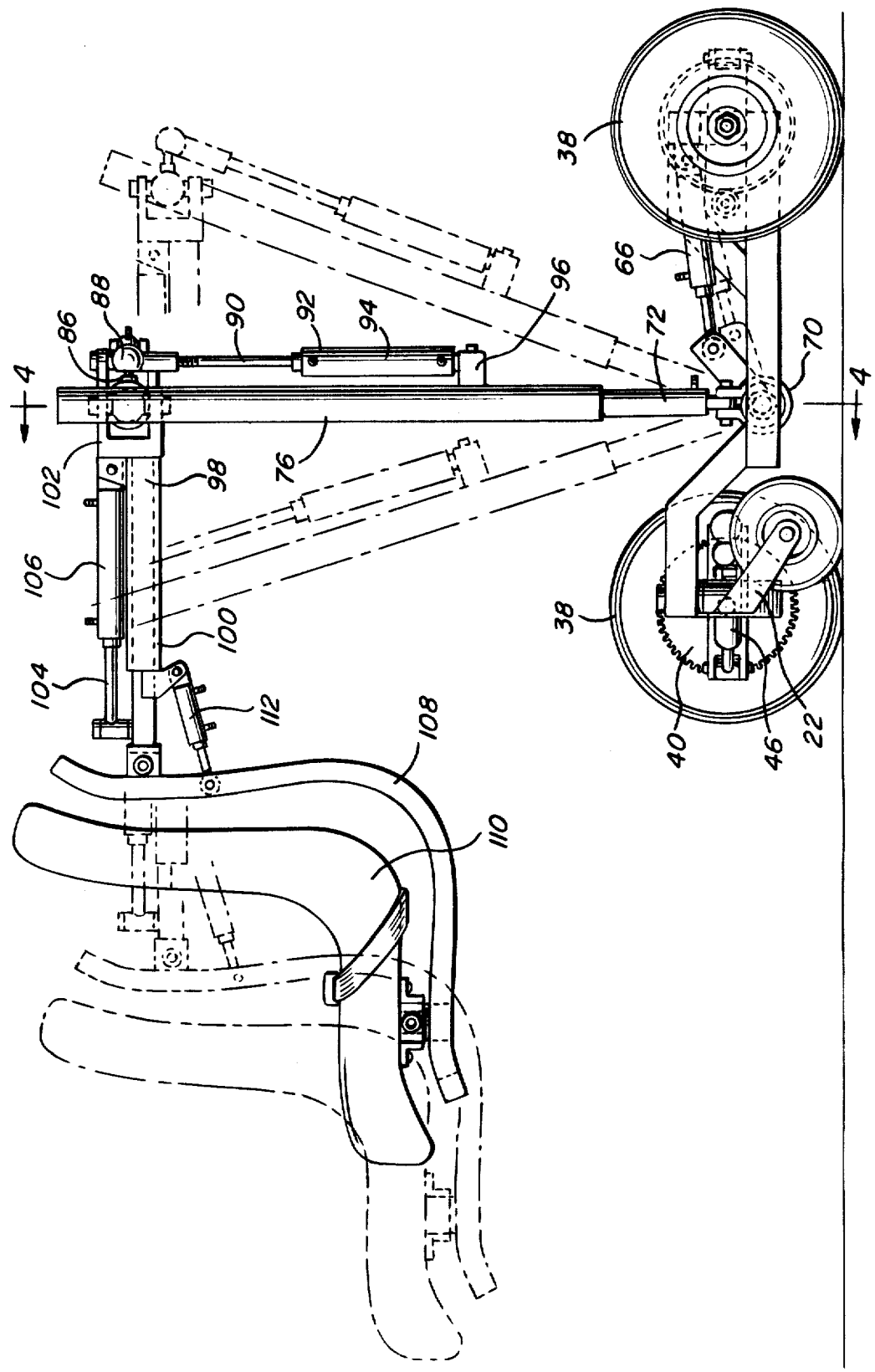

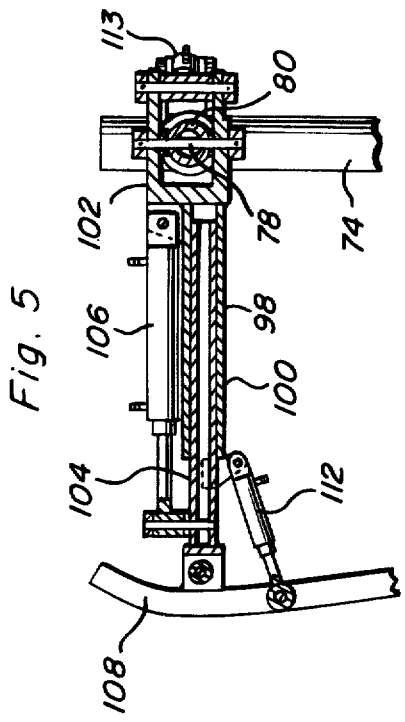
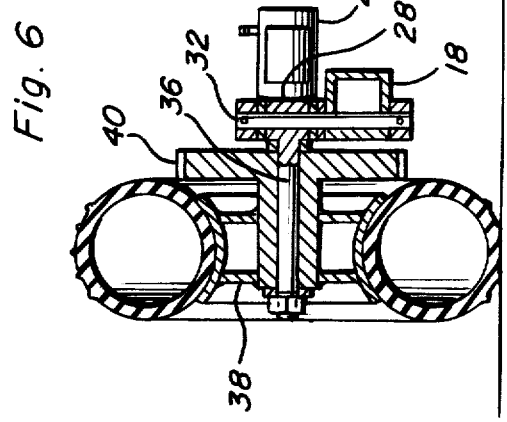
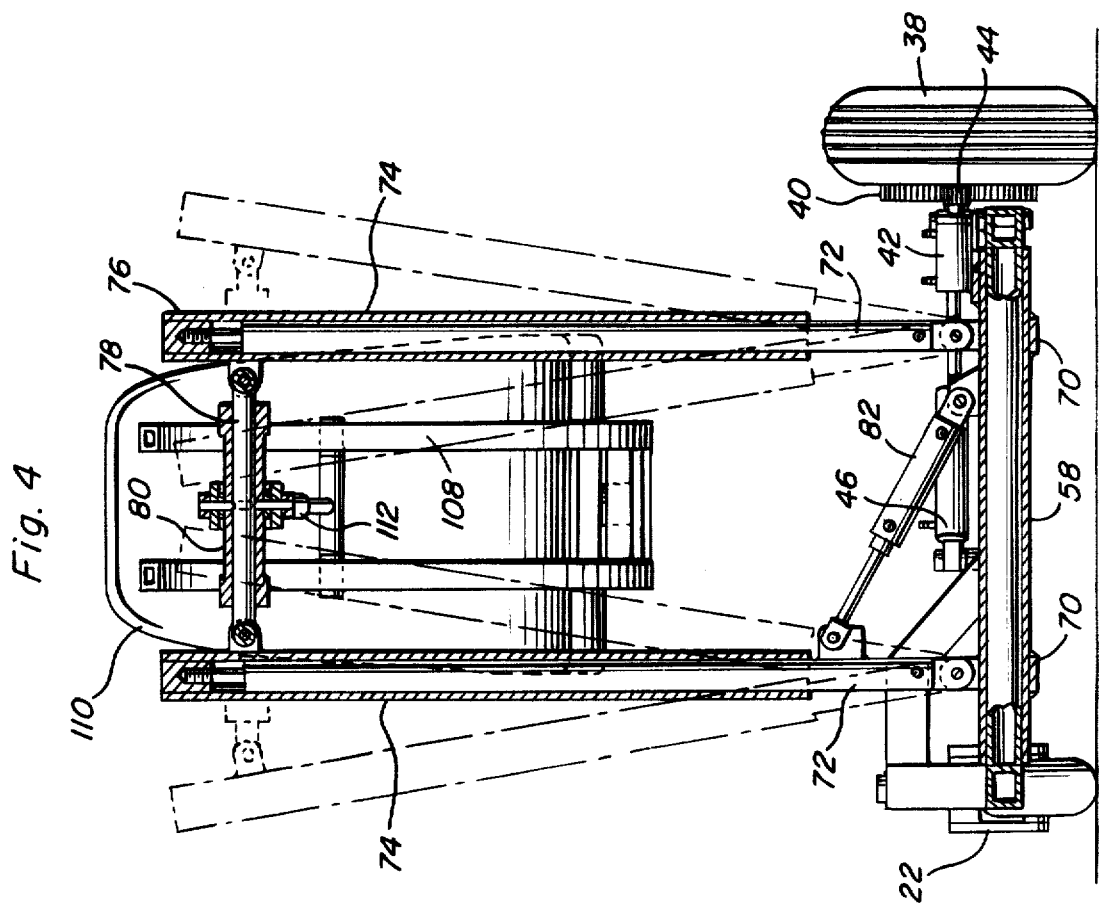

MOBILE SUPPORT

BACKGROUND OF THE INVENTION

There are many different tasks and environments which require highly maneuverable mobile supports including load or operator support structure mounted thereon which may be variably shifted relative to the support.

Disabled persons may use mobile supports of this type for transport from one location to another and variable orientation relative to a stationary object, such as a piece of equipment or machine being operated by the person using the support or having work performed thereon by the support user.

Although many forms of mobile supports heretofore have been developed such as those disclosed in U.S. Pat. Nos. 3,882,949, 3,901,337, 3,905,436, 3,937,519, 3,952,822 and 4,010,499, some of these previously known forms of mobile supports do not include all of the maneuverability and operator or supported load adjustment features of the instant invention.

SUMMARY OF THE INVENTION

The mobile support includes a generally rectangular frame having two pairs of diagonally opposite corner portions. A first pair of omnidirectional support structures are mounted from a first pair of diagonally opposite corner portions and a second pair of reversely and variably drivable support structures are steerably mounted from the second pair of diagonally opposite corner portions for angular displacement about upstanding axes relative to the frame. Steering control structure is operably connected between the frame and the second pair of support structures for selectively variably and equally angularly displacing the second pair of support structures relative to the frame. Further, a pair of upright extendible standards are mounted at their lower ends from the frame for simultaneous oscillation a horizontal axis extending between the lower ends of the uprights. Also, the lower ends of the uprights are supported for equal angular displacement about horizontal axes disposed generally normal to the first mentioned axis and a support bar is pivotally connected between the upper ends of the uprights and a sleeve is oscillatable on the support bar about its longitudinal axis. Further, the longitudinal midportion of the sleeve includes an outwardly projecting and longitudinally extendible support arm from whose free extendible end a load support structure is oscillatably supported for angular displacement about a horizontal axis extending transversely of the support arm. When the mobile support is used for transport of a disabled person from one location to another, that person may orient himself as desired relative to an adjacent stationary object and the mobile support may be moved forwardly or rearwardly along a front to rear extending first path, in a diagonal direction inclined relative to the first path along a path disposed at right angles relative to the first path, about turns of different radius of curvature and also rotated about a center point of the frame. By providing a mobile support of this type, total mobility in a horizontal plane may be achieved by the operator of the support and adjustment of the operator seat of the support may be effected both vertically and horizontally relative to the support.

The main object of this invention is to provide a mobile support which may be readily maneuvered in all horizontal directions, through turns of different radii of curvature and which may also be rotated about a central stationary point.

Still another object of this invention is to provide a mobile support which may be reversely moved and which includes a load supporting structure mounted thereon for multi-directional shifting in both horizontal and vertical planes, as well as angular displacement about a horizontal axis.

Still another very important object of this invention is to provide a mobile support which is particularly well adapted to be utilized by a physically disabled person for transport of that person from one location to another.

Another object of this invention is to provide a mobile support which also may be utilized as a load transporting device with an operator of the support stationarily positioned relative to the frame thereof and the supported load being adjustably mounted relative to the mobile support frame.

A final object of this invention to be specifically enumerated herein is to provide a mobile support in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged left hand elevational view of the mobile support;

FIG. 4 is a vertical sectional view taken substantially upon the plane indicated by the section line 4—4 of FIG. 2;

FIG. 5 is a fragmentary enlarged vertical sectional view taken substantially upon the plane indicated by the section line 5—5 of FIG. 3;

FIG. 6 is an enlarged fragmentary vertical sectional view taken substantially upon the plane indicated by the section line 6—6 of FIG. 3.

DETAILED DESCRIPTION OF THE INVENTION

Figure 1:
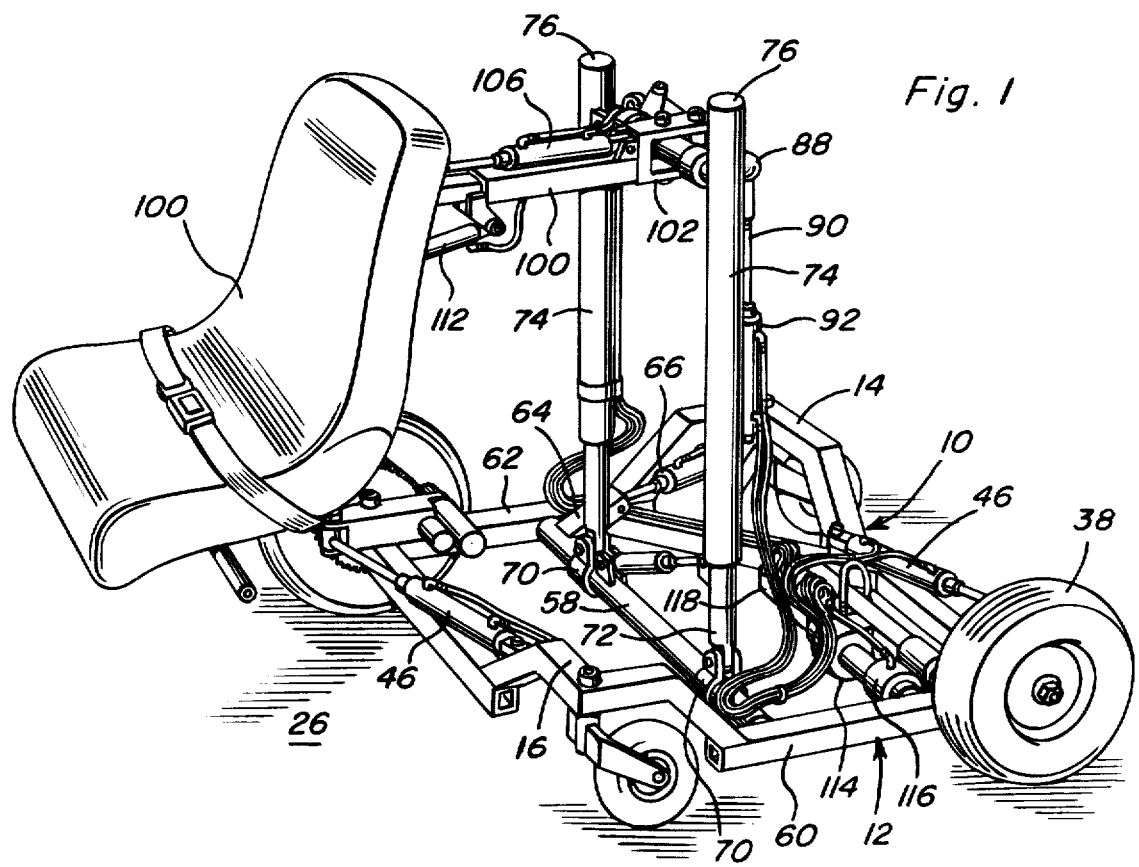
FIG. 1 is a perspective view of the mobile support of the instant invention with the load supporting structure thereof supporting an operator's seat.

Referring now more specifically to the drawings, the numeral 10 generally designates the mobile support of the instant invention. The mobile support includes a generally rectangular main frame 12 including a first pair of elevated diametrically opposite corner portions 14 and 16 and a second pair of low elevation corner portions 18 and 20. The corner portions 16 and 18 lie in and are spaced horizontally along a vertical plane which intersects with a second vertical plane containing the corner portions 18 and 20. The corner portions 14 and 16 are disposed on opposite sides of the vertical plane containing the corner portions 18 and 20 and the corner portions 18 and 20 are disposed on opposite sides of the vertical plane containing the corner portions 14 and 16.

Omnidirectional support structure 22 and 24 comprising caster wheel assemblies are supported from the corner portions 14 and 16 for angular displacement about upstanding axes. By the term "omnidirectional support structure", it is meant that the corner portions 14 and 16 of the frame are supported from the support surface 26 upon which the caster wheel assemblies 22 and 24 rest for movement in all directions thereover. The omnidirectional support structures 22 and 24 could comprise suitably supported spherical ball members enabling movement in all horizontal directions, or the support structures 22 and 24 could comprise magnetic or air cushion support pads which also would enable movement of the corner portions 14 and 16 in all horizontal directions over the surface 26.

Figure 7:
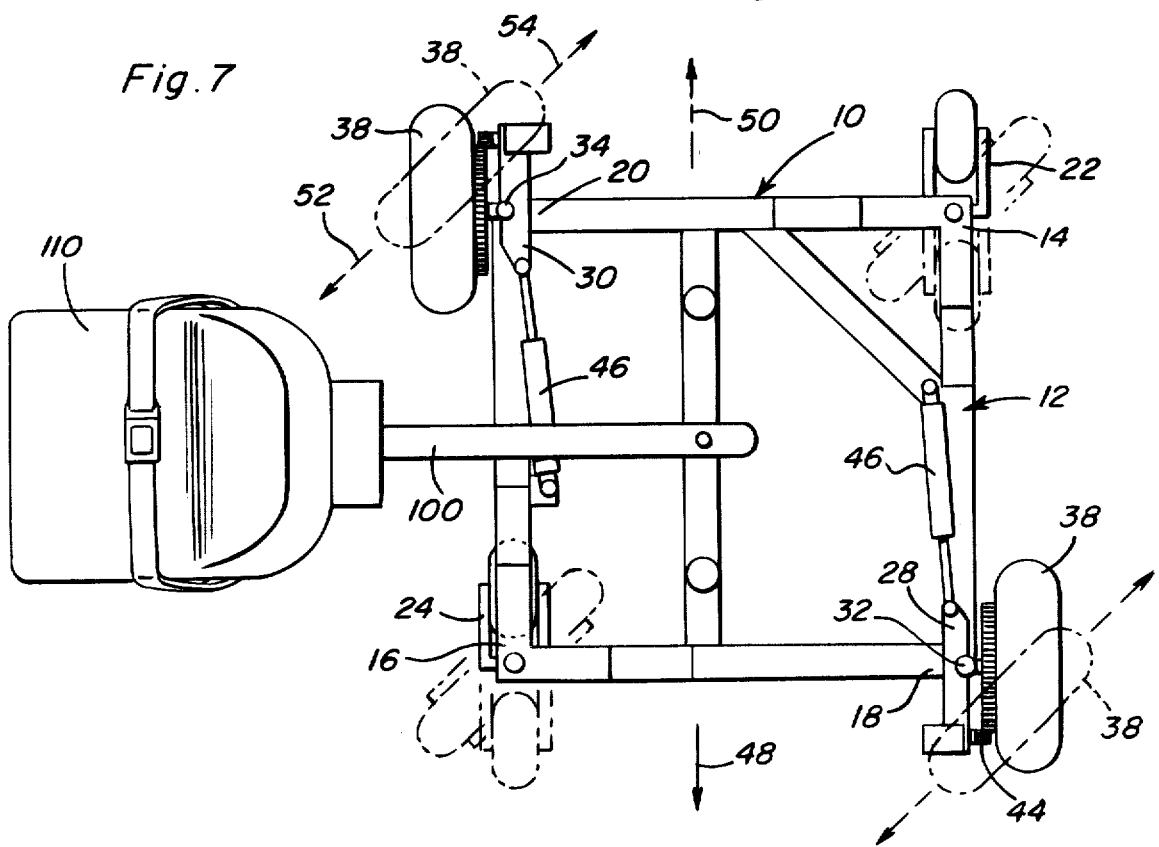
FIG. 7 is a top plan view of the mobile support with numerous specific structural features thereof omitted and illustrating the various maneuverability features thereof.
Figure 3:
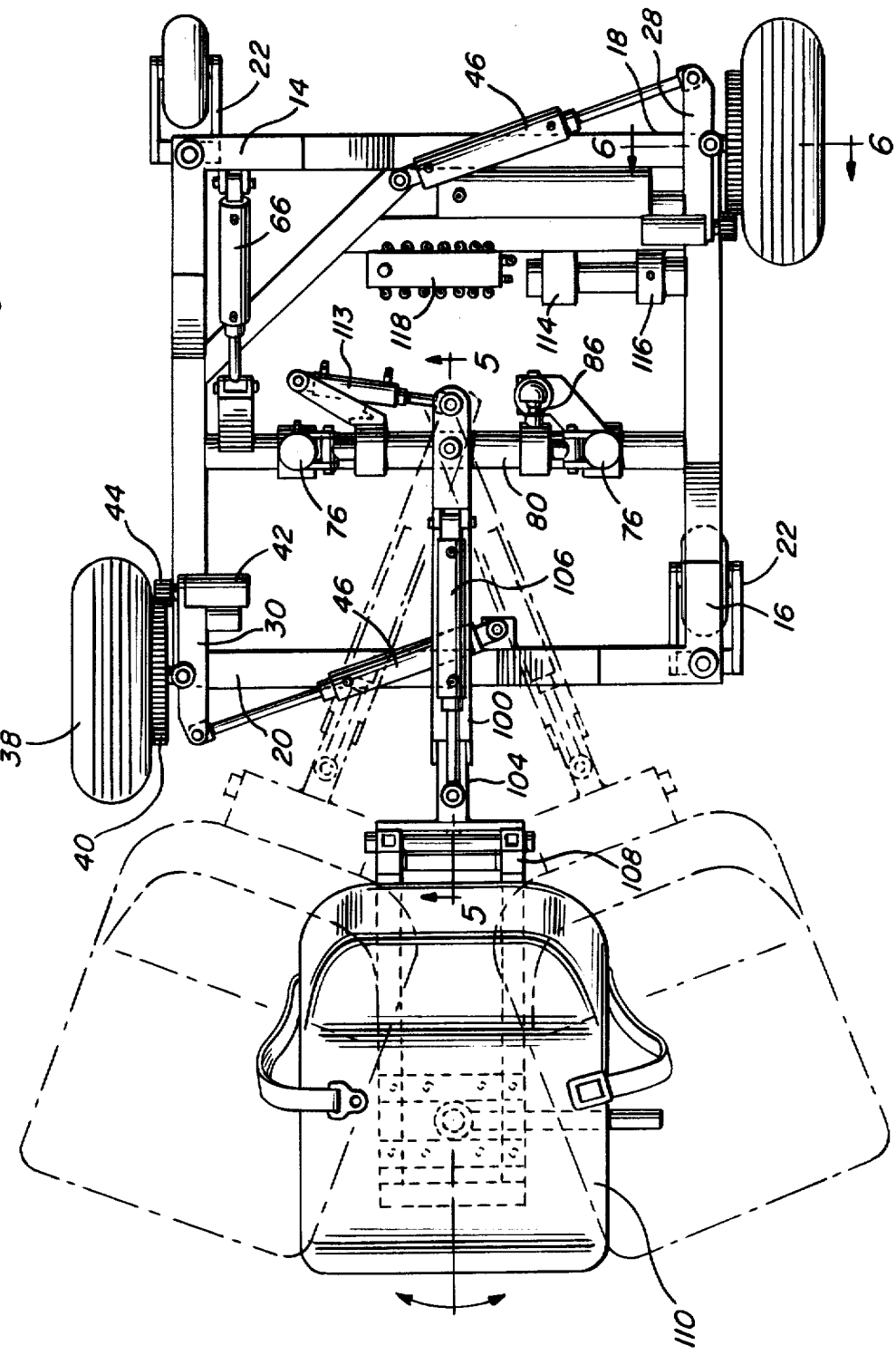
FIG. 3 is a top plan view of the support illustrated in FIG. 2.

The corner portions 18 and 20 support reversely and variably drivable support structures 28 and 30 therefrom. The support structures 28 and 30 are supported from the corner portions 18 and 20 for oscillation about vertical pivot structures 32 and 34 and each support structure 28 includes a spindle 36 supported therefrom upon which a support wheel 38 is journaled. Each support wheel 38 includes a large driven gear 40 rotatable therewith and each support structure 28 and 30 include a reversible and variable speed fluid motor 42 driving a pinion gear 44 meshed with the corresponding drive gear 40. Accordingly, each wheel 38 may be driven reversely and at variable speeds. Also, a double acting fluid cylinder 46 is operably connected between the frame 12 and each of the support structures 28 and 30 for angular displacement of the latter about the pivot structures 32 and 34 throughout an arc of approximately 90°. The support structures 28 and 30 may be angularly displaced relative to the frame 12 from the solid line positions thereof illustrated in FIG. 7 of the drawings through the phantom line positions of FIG. 7 and to positions disposed at generally right angles relative to the solid line positions thereof illustrated in FIG. 7. Accordingly, the support 10 may move in reverse directions as illustrated by the arrows 48 and 50 in FIG. 7, in reverse directions along a path disposed generally normal to the path along which the arrows 48 and 50 extend and in variably angled paths as indicated by the arrows 52 and 54 in FIG. 7.

The previously described movements of the support 10 are effected by adjustment of the cylinders 46 and simultaneous and equal driving of the wheels 38. However, one of the wheels 38 may be held stationary while the other wheel 38 is driven in either direction and turned to a position thereof such as that illustrated in phantom lines in FIG. 7. This, of course, will cause the support 10 to rotate about the non-driven wheel 38. Further, the wheels 38 may be turned to the positions thereof illustrated in phantom lines in FIG. 7 and driven at equal speeds in opposite directions so as to cause the support 10 to pivot about a center upstanding axis. Also, when the wheels 38 are turned to positions thereof such as that illustrated in phantom lines in FIG. 7 and driven at different speeds, the support 10 will execute a turn with the radius of curvature of the turn being determined by the differential in speed of rotation of the wheels 38.

Referring now more specifically to FIGS. 1 through 5 of the drawings, it may be seen that the support 10 includes a central horizontal transverse support pipe 58 which extends between and is oscillatably supported from opposite side portions 60 and 62 of the frame 12. The support pipe includes a crank arm 64 mounted thereon and a double acting fluid cylinder 66 is operably connected between the crank arm and the frame 12 for oscillating the support pipe 58. A pair of mounts 70 are carried by opposite end portions of the support pipe 58 and pivotally mount the lower piston rod portions 72 of a pair of double acting fluid cylinders 74 therefrom for oscillation of the cylinders 74 about parallel axes disposed substantially normal to the axis of oscillation of the support pipe 58. The upper end portions of the cylinder portions 76 of the cylinders 74 have a bracing arm 78 pivotally interconnected therebetween whereby the cylinders 74, the bracing arm 78 and pipe 58 define a parallelogram linkage. A mounting sleeve 80 is oscillatably mounted on the bracing arm 78 for angular displacement relative thereto and a double acting fluid cylinder 82 is connected between the piston rod portion 72 of one of the cylinders 74 and the support pipe 58 whereby the cylinders 74 may be oscillated between the phantom line positions thereof illustrated in FIG. 4. Of course, the fluid cylinder 66 may oscillate the cylinders 74 between the phantom line position thereof illustrated in FIG. 2.

The mounting sleeve 80 includes a ball member 86 (see FIGS. 2 and 3) mounted thereon and projecting rearwardly from one end thereof. A socket member 88 carried by the upper free end of the piston rod portion 90 of a double acting fluid cylinder 92 is universally coupled to the ball member 86 and the lower end of the piston rod portion 94 of the cylinder 92 is pivotally anchored relative to a mount 96 carried by one of the cylinder portions 76. Accordingly, the mounting sleeve 80 may be oscillated relative to the brace arm 78.

One base end 98 of a support arm 100 is bifurcated as at 102 and pivoted from the mounting sleeve 80. The support arm 100 includes an extendible end 104 and a double acting fluid cylinder 106 is operably connected between the base end 98 and the extendible end 104 whereby the support arm 100 may be selectively extended. A load support 108 including an operator's seat 110 is mounted on the outer end of the extendible end 104 for oscillation relative thereto about a horizontal transverse axis and a double acting fluid cylinder 112 is operably connected between the load support 108 and the extendible end 104 whereby the load support 108 may be oscillated relative to the extendible end 104. Further, a double acting fluid cylinder 113 is connected between the bifurcated end 102 and the sleeve 80 for swinging the arm 100 between the phantom line positions of FIG. 3.

The frame 12 supports a drive motor 114 (preferably electrical) and the motor 114 drives a hydraulic pump 116 which supplies fluid under pressure to a valve assembly 118. Suitable hoses interconnect the valve assembly 118 and the various cylinders 46, 74, 82, 94, 106 and 112 as well as the motors 42 through a suitable control assembly (not shown) mounted for support by an operator disposed in the seat 110. Alternately, such a control assembly may be mounted on the frame 12 if the support 108 is to be used to handle and move materials as opposed to support the operator of the mobile support 10. All of the hydraulic cylinders are of the double acting type and the motors 42 are operable, selectively, in the same direction, in reverse directions, at different speeds and individually. Of course, any suitable form of hydraulic control assembly of a well known type may be used for this purpose.

In addition, the motors 42 are directly geared to the driven gears 40. However, the gears 40 and 44 could be sprocket gears drivingly connected through the utilization of endless chains trained thereabout. Also, it is to be noted that the motors 42 and wheels 38 propel the mobile support and the angular positioning of the support structures 28 and the direction and speed of rotation of the motors 42 control movement of the support over the surface 26.

Also, it is to be noted that the cylinders 46, 74, 82, 94, 106, 112 and 113 may be replaced by other motor means such as reversible electric motor powered screw jacks and that motors 42 may be replaced by reversible electric motors. Of course, in order to control such numerous reversible electric motors, a suitable electrical control assembly would also be provided.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A mobile support including a base frame defining two pairs of opposite marginal portions with said pairs of marginal portions spaced horizontally apart in vertical planes intersecting each other and with each pair of marginal portions spaced on opposite sides of the point of intersection of said planes, a first pair of omnidirectional ground engageable support means mounted from a first pair of said marginal portions and a second pair of reversely and variably drivable ground engageable support means steerably mounted from the second pair of marginal portions for angular displacement about upstanding axes relative to the second pair of marginal portions, and steering control means operably connected between said frame and said second pair of support means for selectively variably and equally angularly displacing said second pair of support means relative to said second marginal portions.

2. The structure of claim 1 wherein said first pair of omnidirectional support means comprise caster wheel assemblies.

3. The support of claim 1 wherein said second pair of support means include wheels journaled therefrom for rotation about generally horizontal axes and means for selectively, reversely and variably driving said wheels.

4. The support of claim 3 wherein said first pair of omnidirectional support means comprise caster wheel assemblies.

5. The structure of claim 1 including a support portion mounted on said frame for oscillation about a horizontal axis, a pair of upstanding extendible and retractable cylinders pivotally attached at their lower ends to said support portions at points spaced along the axis of oscillation thereof and for oscillation of said cylinders relative to said support portion about parallel axes disposed generally normal to the axis of oscillation of said support portion, an upper generally horizontal support member extending between and having its opposite ends interconnected between the upper ends of said cylinders for oscillation relative thereto about axes paralleling the first mentioned axes, a sleeve mounted on said support member for oscillation about an axis extending longitudinally of said support member, and a support arm having base and free ends, said base end of said support arm being supported from said sleeve for oscillation therewith, the free end of said support arm including means for supporting a load therefrom, means interconnected between said sleeve and one of said cylinders for oscillating said sleeve relative to said support member, means connected between said support portion and one of said cylinders for oscillating the latter relative to said support portion, and means operatively connected between said frame and said support portion for oscillating the latter relative to said frame.

6. The support of claim 5 wherein said support arm is longitudinally extendible.

7. The support of claim 6 wherein said means for supporting a load is oscillatably supported from the free extendible end of said support arm for angular displacement about an axis transverse to said support arm and paralleling the axis of oscillation of said sleeve.

8. The support of claim 7 wherein the base end of said support arm is pivotally supported from said sleeve for oscillation relative thereto about an axis disposed generally normal to the axis of oscillation of said sleeve, and means operatively connected between said sleeve and said support arm for effecting oscillation of said support arm relative to said sleeve.

9. A mobile support including a base frame having ground engageable support means for moving said frame over a support surface, said frame including a support portion mounted on said frame for oscillation about a horizontal axis, a pair of upstanding extendible and retractable cylinders pivotally attached at their lower ends to said support portion at points spaced along the axis of oscillation thereof and for oscillation of said cylinders relative to said support portion about parallel axes disposed generally normal to the axis of oscillation of said support portion, an upper generally horizontal support member extending between and having its opposite ends interconnected to the upper ends of said cylinders for oscillation relative thereto about axes paralleling the first mentioned axes, a sleeve mounted on said support member for oscillation about an axis extending longitudinally of said support member, and a support arm having base and free ends, said base end of said support arm being supported from said sleeve for oscillation therewith, the free end of said support arm including means for supporting a load therefrom, means interconnected between said sleeve and one of said cylinders for oscillating said sleeve relative to said support member, means connected between said support portion and one of said cylinders for oscillating the latter relative to said support portion, and means operatively connected between said frame and said support portion for oscillating the latter relative to said frame.

10. The support of claim 9 wherein said support arm is longitudinally extendible.

11. The support of claim 10 wherein said means for supporting a load is oscillatably supported from the free extendible end of said support arm for angular displacement about an axis transverse to said support arm and paralleling the axis of oscillation of said sleeve.

12. The support of claim 11 wherein the base end of said support arm is pivotally supported from said sleeve for oscillation relative thereto about an axis disposed generally normal to the axis of oscillation of said sleeve, and means operatively connected between said sleeve and said support arm for effecting oscillation of said support arm relative to said sleeve.

13. A mobile support including a base frame defining first and second horizontally spaced apart mounting portions and a third mounting portion horizontally spaced from each of said first and second mounting portions in a vertical plane containing said first and second mounting portions, first omnidirectional ground engageable support means mounted from said third mounting portion and a pair of reversely and variably drivable ground engageable support means steerably mounted from said first and second mounting portions for angular displacement about upstanding axes relative to said first and second mounting portions, and steering control means operably connected between said frame and said pair of ground engageable support means for selectively variably and equally angularly displacing said pair of ground engageable support means relative to said first and second mounting portions.

* * * * *